Patented Aug. 30, 1927.

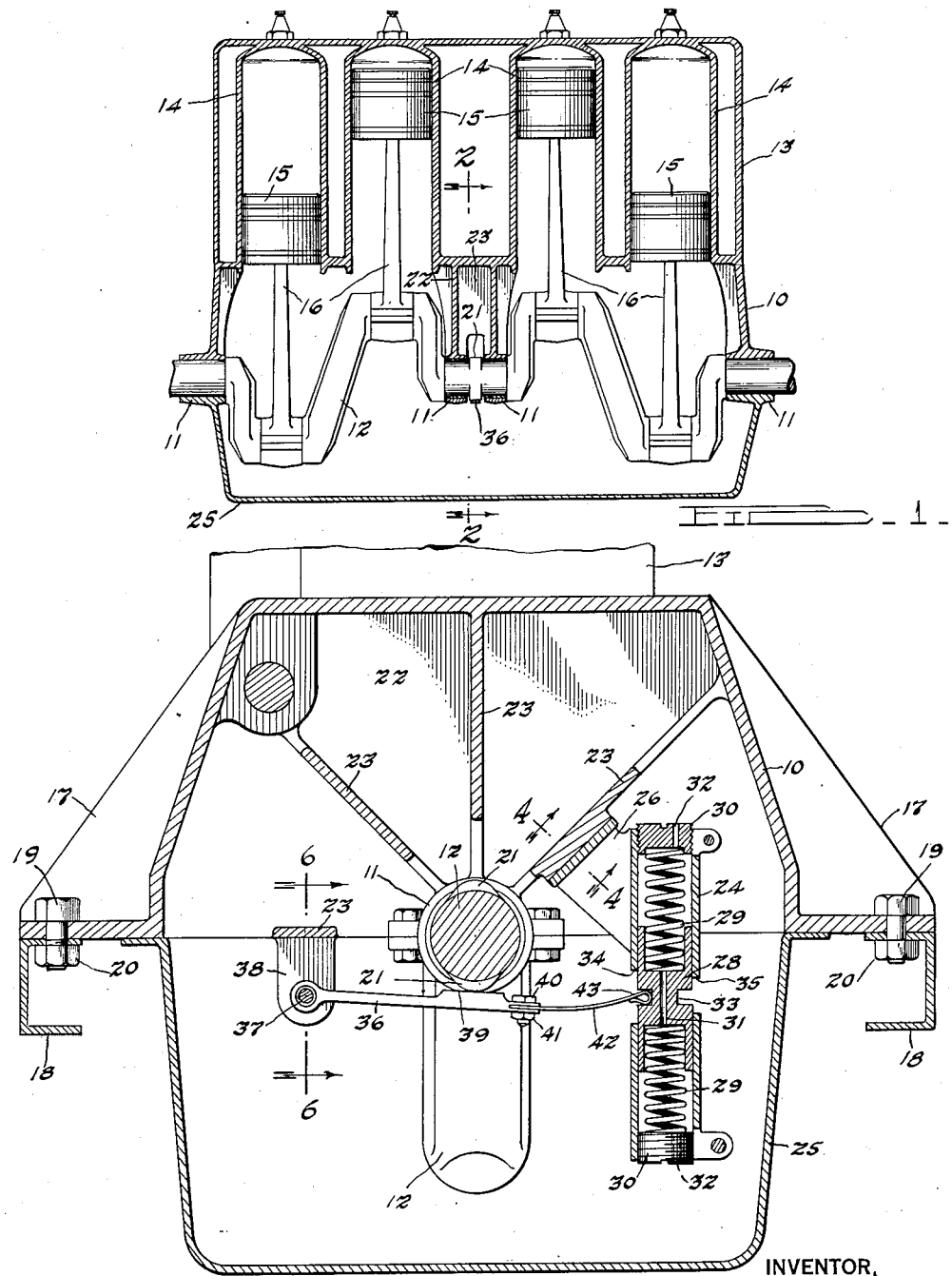

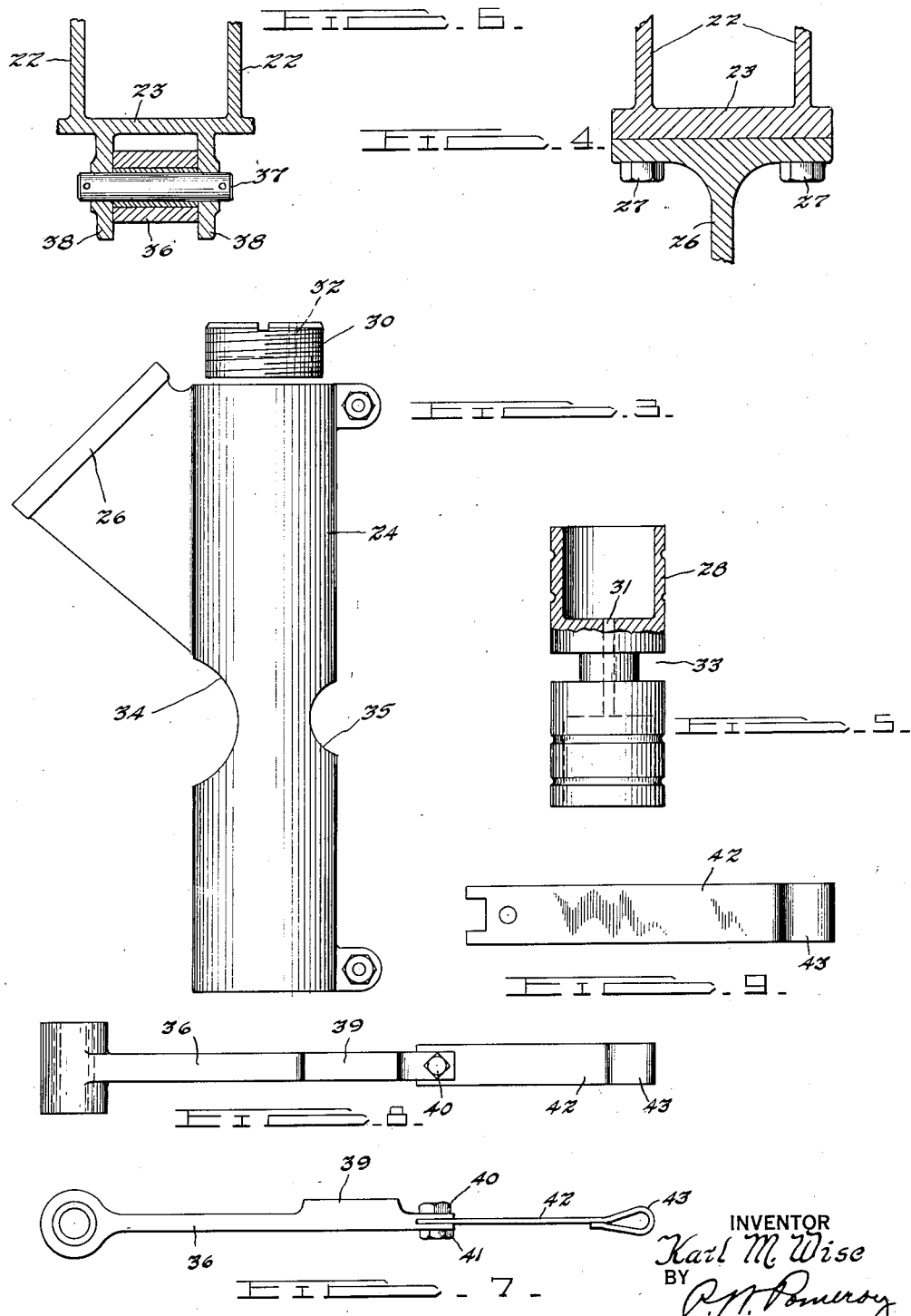

1,640,634

UNITED STATES PATENT OFFICE.

KARL M. WISE, OF SOUTH BEND, INDIANA, ASSIGNOR TO THE STUDEBAKER CORPORATION, OF SOUTH BEND, INDIANA, A CORPORATION OF NEW JERSEY.

INTERNAL-COMBUSTION ENGINE.

Application filed March 18, 1927. Serial No. 176,535.

This invention relates to internal combustion engines and particularly to the relation thereof with respect to their supporting means, the principal object being the provision of means for damping out the vibrations in the engine due to secondary unbalanced forces, at those speeds at which such vibrations synchronize with the natural period of vibration of the engine supporting means.

Another object is to provide, in combination with an internal combustion engine and its supporting means, a vibratory mass adapted to be set in motion at those speeds of the engine at which the secondary unbalanced forces of the engine synchronize with the natural period of vibration of the engine supporting means, or a harmonic thereof, whereby such secondary unbalanced forces will be neutralized and no apparent vibration of the engine in its support will occur.

Another object is to provide, in combination with an internal combustion engine and its supporting means, a spring-controlled mass subject to positive impulses directly proportionate to the speed of the engine, means being provided to actuate said spring-controlled mass to oppose the secondary vibrational forces of the engine at such time as such secondary forces synchronize with the natural period of vibration of the engine supporting means, or a harmonic thereof.

Another object is to provide, in combination with an internal combustion engine and its supporting means, a vibratory mass having a path of movement parallel to the direction of piston travel of the pistons of said engine and having a natural period of vibration approximately equal to the natural period of vibration of the engine supporting means, means being provided for imparting positive impulses to said mass whereby the same will be actuated at such times as the frequency of vibration of the secondary unbalanced forces in the engine synchronize with the natural period of vibration of said supporting means, whereby said mass will neutralize the secondary unbalanced forces acting at that time and prevent apparent vibration of the engine.

Another object is to provide, in combination with an internal combustion engine and its supporting means, a spring-controlled mass carried by the engine capable of vibrating in a plane parallel to the plane of piston travel of said engine, said mass having a natural period of vibration substantially equal to the natural period of vibration of said supporting means, or a harmonic thereof, means being provided for imparting positive actuating impulses to said mass from said engine at a frequency in direct relation to the speed of said engine, whereby said mass will be caused to vibrate at such speeds of the engine wherein the frequency of vibration of the secondary unbalanced forces of the engine synchronizes with the natural period of vibration of the engine support, thereby neutralizing such secondary unbalanced forces and eliminating the otherwise synchronized vibration of both the engine and its supporting means.

Another object is to provide in combination with an internal combustion engine and its support, a dampened spring-controlled mass having a natural period of vibration approximating the natural period of vibration of said engine support, and positioned to be affected by the secondary unbalanced forces of said engine whereby said mass will be caused to vibrate at such engine speeds as the secondary unbalanced forces synchronize with the natural period of vibration of said engine support, and will thereby neutralize said secondary forces at said speed and prevent the resulting synchronized vibration of both said engine and said support.

A further object is to provide, in combination with an internal combustion engine and its support, a spring-controlled mass having a natural period of vibration approximating the natural period of vibration of said engine support, or a harmonic thereof, capable of vibrating in the direction of the piston travel of said engine, and means engaging said mass connected by a resilient element to a positively actuated engine part to receive impulses therefrom, said mass adapted to be actuated to set up forces equal and opposite to the secondary unbalanced forces in said engine at such speeds of the engine as such secondary unbalanced forces synchronize with the natural period of vibration of said engine supports, or a harmonic thereof.

The above being among the objects of the present invention, the same consists of certain features of construction and combinations of parts to be hereinafter described with reference to the accompanying drawings, and then claimed, having the above and other objects in view.

In the accompanying drawings which illustrate a suitable embodiment to the present invention, and in which like numerals refer to like parts throughout the several views.

Figure 1 is a vertical section of an internal combustion engine taken longitudinally through the center thereof illustrating the location of the present invention in relation to the crank shaft thereof.

Figure 2 is an enlarged fragmentary sectional view taken approximately on the line 2—2 of Figure 1.

Figure 3 is a side view of the cylinder which encloses the vibratory mass, the relative position of which in respect to the engine is indicated in Figure 2.

Figure 4 is an enlarged partially broken sectional view taken on the line 4—4 of Figure 2 indicating the means of supporting the cylinder member on the engine.

Figure 5 is an enlarged partially broken sectional view of the spring controlled mass adapted to vibrate within the cylinder member shown in Figure 3.

Figure 6 is a sectional view taken on the line 6—6 of Figure 2, illustrating the method of supporting the tappet member on the engine.

Figure 7 is an enlarged side view of the tappet member used for imparting positive impulses from the crank shaft to the vibratory mass.

Figure 8 is a plan view of the tappet member shown in Figure 7.

Figure 9 is an enlarged plan view of the resilient tappet and member.

In internal combustion engines, particularly those having four cylinders, those pistons at the top of the stroke when the engine is running have a different velocity than those at the bottom of the stroke, with the result that a secondary unbalanced force is set up due to the difference in inertia forces acting on these pistons. These secondary unbalanced forces tend to cause a vibration of the engine, but as a general rule they are not so apparent as to be objectionable until such time as their frequency synchronizes with the natural period of vibration of the engine support, or a harmonic thereof. When this condition occurs, the secondary unbalanced forces acting in resonance with the engine support produce an apparent vibration of the entire engine which is generally transmitted to the entire vehicle of which it forms a part, and which is very objectionable to the occupants of the same. As previously mentioned, this apparent vibration occurs and is objectionable only when the frequency of the secondary unbalanced forces, which in four cylinder engines is twice the number of revolutions per minute which the engine is turning over, synchronizes with the natural period of vibration of the engine support, or a harmonic thereof. The result is, that as a general rule this apparent vibration occurs only twice in the entire speed range of a vehicle of which it forms a part, and rarely over three times. In the general run of automobiles equipped with four cylinder engines, the most objectionable vibration from this cause occurs at a speed of approximately from 30 to 35 miles per hour.

The present invention contemplates the provision of means for neutralizing the secondary unbalanced forces at such speeds of the engine as the frequency of the secondary unbalanced forces synchronizes with the natural period of the engine support or a harmonic thereof, these means being substantially inoperative at other speeds of the engine.

As illustrative of the present invention, I show in the accompanying drawings a four cylinder internal combustion engine having a crank case 10 within which a crank shaft 12 is rotatively supported by the bearings 11. Formed integral with the upper face of the crank case 10 is the conventional cylinder block 13 incorporating suitable cylinders 14 therein. Conventional pistons 15, slidably received within the cylinders 14, are connected for relative movement with respect to the crank shaft 12 by the conventional connection rods 16.

The crank shaft 12 is of conventional design excepting for the differences to be hereinafter pointed out, it being provided with four throws, all of which are situated in the same plane, and the center two of which are disposed on the opposite side of the crank shaft center from the two end throws. The engine may, of course, be supported by any suitable means in the vehicle of which it forms a part, but in the drawings it is shown as being provided with outwardly extending arms 17 which rest on suitable sub-frame members 18 and are secured thereto by bolts 19 and nuts 20. The form of support is immaterial to the present invention, as all supports, whether alone or in combination with the accompanying chassis frame (not shown), have a natural period of vibration such as previously described.

The center bearing 11 for the crank shaft 12 is split to form, in effect, two spaced bearings. Formed on the crank shaft 12 between the two center bearings 11 are two diametrically opposed cams 21, purposely exaggerated in size in the drawings to better illustrate the present invention, which are positioned in the same plane as the throws of the crank shaft 12. The center bearings 11 are supported from the side of the crank case 10 by conventional transverse webs 22, and occasional cross webs 23 are provided for tying the webs 22 together.

A vertically positioned cylinder 24 lying within the crank case 10 and oil pan 25 is provided with an attaching flange portion 26 which is secured to one of the cross webs 23 by screws 27, as indicated in Figures 2 and 4. The cylinder member 24, which has a bore of relatively small diameter, is positioned in transverse alignment with the cams 21 on the crank shaft 12. Within the cylinder 24 is slidably received a relatively heavy piston 28 normally held centrally between the ends thereof by the coil springs 29 and adjustable plugs 30. The coil springs 29 are so proportioned in respect to the mass of the piston 28, that the piston 28 has a natural period of vibration approximately equal to the natural period of vibration of the supports 18. The piston 28 is provided with a vertical vent opening 31 extending axially therethrough and the plugs 30 are provided with similar vent openings 32 which allow for displacement of the air within the cylinder 24 on displacement of the piston 28, their size being sufficiently small to exert damping effect upon the vibration of the piston 28, when the latter is vibrating.

The piston 28 is provided with a central peripheral groove 33 for a purpose to be hereinafter described, and the central wall portion of the cylinder 24 is cut away as at 34 and 35. A tappet member 36 is pivotally mounted on the pin 37 in transverse alignment with the cam 21 so as to be swingable in a vertical plane, the pin 37 being carried between two ears 38 projecting downwardly from the web 23 at the lower face of the crankcase 10, as indicated in Figures 2 and 6. The tappet member 36 extends transversely of the engine from the pin 37, between the two center bearings 11 and in contact with the crank shaft 12 therebetween, it being provided with a hardened face portion 39 for contact with the crank shaft 12 and cams 21 formed thereon at that point. Secured in the slotted free end of the tappet member 36 by the screw 40 and nut 41 is a flexible spring member 42, the free end of which is formed into an eye 43 which is slidably received within the groove 33 in the piston 28. The springs 29 in the cylinder 24 are adjusted by means of the plugs 30 so that the tappet face 39 of the tappet member 36 is resiliently held in constant contact with the coacting surface of the crank shaft 12. As the crank shaft 12 rotates, it will be apparent that the cams 21 thereof will contact with the surface 39 and will cause the tappet member 36 to pivot about the pin 37, and this force acting through the spring 42 will be transmitted to the piston 28 and will exert a tendency to move the piston 28 downwardly against the lower spring 29. Under normal conditions, the spring 42 is not of sufficient strength to cause any appreciable compression of the lower spring 29 in the cylinder 24, the spring member 42 in such cases bending, as indicated in Figure 2, in order to allow movement of the tappet member 36, and the piston 28 will be very slightly moved if at all. The movement of the tappet member 36 due to the rotation of the crank shaft 12 and consequent contact with the cam 21 does impart, however, to the piston 28, forces in the form of impulses, the frequency of which depends upon the number of times per unit of time that the cams 21 contact therewith. When, however, the speed of the crank shaft 12 becomes such that the number of impulses imparted to the piston 28 through the tappet member 36 approaches the frequency of the natural period of vibration of the piston 28 between the springs 29, the piston 28, having a natural tendency to vibrate at that frequency, will be affected by these impulses and will be caused to vibrate, and the vibrational displacement of the piston 28 in such cases will be much greater than the apparent movement of the tappet 36 on it. Due to the fact that the cams 21 are positioned in the same plane as the throw of the cranks of the crank shaft 12, each time a pair of pistons 15 reaches the upper top center at such engine speeds, the piston 28 when vibrating will be projected downwardly. The force of such downward projection of the piston 28 may be mathematically calculated or experimentally determined to be equal to the secondary unbalanced forces acting upwardly on the pistons 14 when at the top of their stroke, so that such secondary unbalanced forces are counteracted by the downward movement of the piston 28 at that time. The effect is that these secondary unbalanced forces are neutralized by the forces set up by the movement of the piston 28.

As has been previously described, the natural period of vibration of the piston 28 is the same as the natural period of vibration of the engine supports 18, so that at those engine speeds at which the secondary unbalanced forces synchronize with the natural period of vibration of the supports 18, such secondary forces are neutralized and are prevented from combining or acting in unison with the natural period of vibration of the supports 18, to produce that objectionable vibration of the entire engine so commonly associated with four cylinder engines at certain engine speeds. The result is that no apparent vibration of the engine occurs, and as far as the passengers of the motor vehicle of which it forms a part are concerned, the engine runs without vibration throughout its entire speed range.

Formal changes may be made in the specific embodiment of the invention described without departing from the spirit or substance of the broad invention, the scope of which is commensurate with the appended claims.

What I claim is:

1. In combination with an internal combustion engine and its supporting means, a vibratory mass supported by said engine having a natural period of vibration approximately equal to the natural period of vibration of said supporting means, or a harmonic thereof, and means for imparting vibratory impulses to said mass in direct proportion to the speed of said engine.

2. In combination with an internal combustion engine and its supporting means, a vibratory mass supported by said engine adapted to vibrate in a plane approximately parallel to the plane of piston travel of said engine, said vibratory mass having a natural period of vibration approximately equal to the natural period of vibration of said supporting means, or a harmonic thereof, and means for imparting positive impulses to said vibratory mass at a frequency directly proportional to the speed of said engine.

3. In combination with an internal combustion engine and its supporting means, a vibratory mass supported by said engine having a natural period of vibration approximately equal to the natural period of vibration of said supporting means, or a harmonic thereof, means for imparting positive impulses to said vibratory mass at a frequency directly proportionate to the speed of said engine, whereby said vibratory mass will be caused to vibrate at the speeds when the secondary unbalanced forces in said engine synchronize with said natural period of vibration of said supporting means or a harmonic thereof, said vibratory mass being proportioned to neutralize said secondary unbalanced forces at such times as said secondary unbalanced forces synchronize with said natural period of vibration of said supporting means.

4. In combination with an internal combustion engine and its supporting means, a vibratory mass having a path of movement parallel to the direction of piston travel of said engine and having a natural period of vibration approximately equal to the natural period of vibration of said engine supporting means, means being provided for imparting positive impulses to said mass whereby the same will be actuated at such times as the frequency of vibration of the secondary unbalanced forces in said engine synchronizes with said natural period of vibration of said supporting means, whereby said mass will neutralize said secondary unbalanced forces acting at that time and prevent apparent vibration of said engine.

5. In combination with an internal combustion engine and its support, a dampened spring-controlled mass having a natural period of vibration approximating the natural period of vibration of said engine support, said mass being acted upon by positive impulses from an engine part and caused to vibrate at the speeds when said secondary unbalanced forces in said engine synchronize with the natural period of vibration of said engine support, said mass being positioned to offset said secondary unbalanced forces to neutralize the same at said engine speed and prevent resulting synchronized vibration of both said engine and said support.

6. In combination with an internal combustion engine and its supporting means, a vibratory mass supported on said engine having a natural period of vibration approximately equal to the natural period of vibration of said supporting means, or a harmonic thereof, and a positively actuated member acted upon by an engine part to impart impulses to said mass at a frequency directly proportional to the speed of said engine, said part including a flexible member.

7. In combination with an internal combustion engine and its supporting means, a vibratory mass supported by said engine having a natural period of vibration approximately equal to the natural period of vibration of said supporting means, or a harmonic thereof, and flexible means positively driven by an engine part for imparting impulses to said vibratory mass at a frequency directly proportional to the frequency of the secondary unbalanced forces in said engine.

8. In combination with an internal combustion engine and its supporting means, a vibratory mass positioned on said engine, having a natural period of vibration approximately equal to the natural period of vibration of said supporting means, or a harmonic thereof, said vibratory mass being positioned to vibrate in a plane parallel to the direction of piston travel of said engine, and positively actuated resilient means for imparting impulses to said mass at a frequency directly proportionate to the speed of said engine, said mass being proportioned to offset the secondary unbalanced forces in said engine at such time as the frequency of said secondary unbalanced forces synchronizes with the natural period of vibration of said supporting means.

9. In combination with an internal combustion engine and its supporting means, a vibratory mass supported by said engine having a natural period of vibration approximately equal to the natural period of vibration of said supporting means, or a harmonic thereof, a cam-operated tappet member resiliently engaging said mass for imparting positive impulses thereto at a frequency directly proportionate to the speed of said engine and in a direction opposite to and at such times as pistons of said engine approach upper dead center position, said mass being proportioned to set up forces equal and opposite to the secondary unbalanced forces in said engine at such times as said mass is caused to vibrate.

10. In combination with an internal combustion engine and its support, a spring-controlled mass having a natural period of vibration approximating the natural period of vibration of said engine support, or a harmonic thereof, said mass being adapted to vibrate in the direction of piston travel of said engine, and means engaging said mass connected by a resilient element to a positively actuated engine part to receive impulses therefrom, said mass being adapted to be actuated to set up forces equal and opposite to the secondary unbalanced forces in said engine at such engine speeds as such secondary unbalanced forces synchronize with the natural period of vibration of said engine support, or a harmonic thereof.

11. In combination with an internal combustion engine and its supporting means, a cylinder supported by said engine in a plane parallel to the direction of piston travel of said engine, a slidable piston in said cylinder, spring means engaging said piston and imparting thereto a natural period of vibration approximating the natural period of vibration of said supporting means, or a harmonic thereof, a rotatable cam, a tappet member engageable with said cam and provided with a resilient element operatively connected to said piston to impart to said piston positive impulses at a frequency directly proportionate with the speed of said engine, said mass being actuated in a direction opposite to the direction of the secondary unbalanced forces in said engine to neutralize the same at such speeds of said engine as said secondary unbalanced forces synchronize with the natural period of vibration of said supporting means.

12. In combination with an internal combustion engine and its supporting means, a perforated cylinder supported within said engine in a plane parallel to the direction of piston travel of said engine, a slidable piston within said cylinder, spring means engaging said piston for controlling the natural period of vibration of said piston in said cylinder, adjustable means engaging said piston for controlling the natural period of vibration of said piston in said cylinder, adjustable means for regulating said spring, cam means on the crank shaft of said engine disposed in the plane of the throws thereof, a swingable tappet member engageable with said cam means, and a resilient end on said tappet member engaging said piston to impart impulses thereto through actuation of said tappet member.

Signed by me at South Bend, Indiana, this 16th day of March, 1927.

KARL M. WISE.